2,991,625
IRRIGATION GATE VALVE

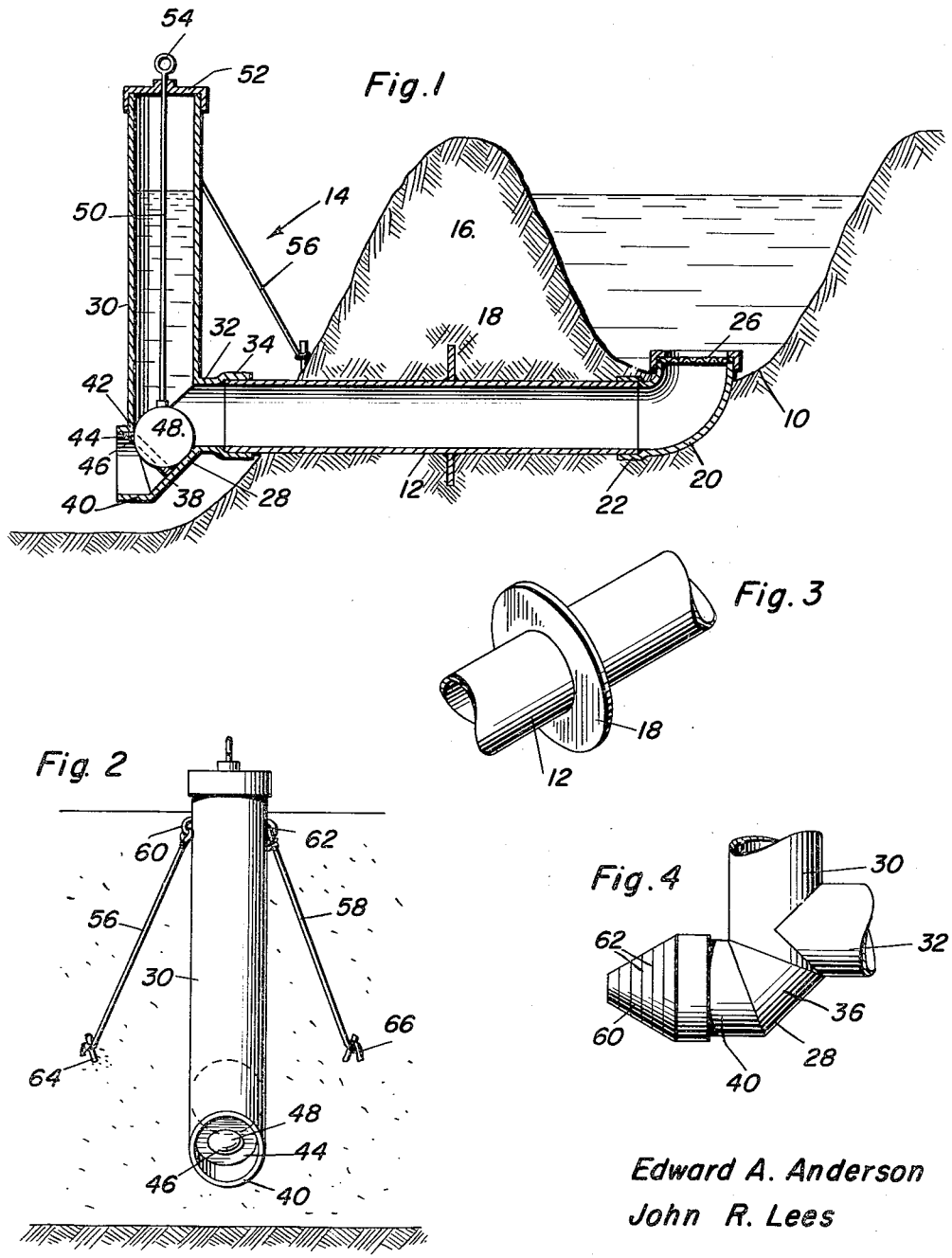

Edward A. Anderson, Laurel, Mont. (4021 S. Billings Blvd., Billings, Mont.), and John R. Lees, 12½ 3rd Ave., Laurel, Mont.
Filed Aug. 30, 1956, Ser. No. 607,040
1 Claim. (Cl. 61—18)

This invention relates to a self-closing irrigation gate which has for its primary object the elimination of a considerable portion of the time and effort necessary to be used in irrigation such as when employing a shovel and canvas or siphon tubes.

The self-closing irrigation gate comprising the present invention can be easily installed in the bank of any irrigation ditch and remain there as a permanent gate or may be easily moved to suit the varying needs of any irrigation project.

The construction of this invention features an arrangement of parts wherein water pressure from a stand pipe and outlet pipe will firmly hold a ball valve member in place against a seat. This will shut-off any water flow. Upon pulling a release rod which is secured to the ball valve member to lift the ball valve member off its seat, the water will flow out and the ball valve member will float in the stand pipe until the water level drops low enough to allow the ball valve member to seat itself again.

A further object of the present invention resides in the provision of a self-closing irrigation gate which is automatic in operation and which when used in conjunction with a main gate for controlling flow of fluid into the irrigation ditch, manual closing of the self-closing gate becomes unnecessary. However, provision is of course made for allowing manual closing of the valve utilized in the invention.

Further objects and features of this invention reside in the provision of a self-closing irrigation gate that is simple in construction, effective in use, which may employ a restricter nozzle or may be formed in different sizes so as to enable different sized fields to be irrigated from a single ditch in substantially the same amount of time, and which self-closing irrigation gate is inexpensive to manufacture, so as to permit wide use and distribution.

These, together with the various ancillary objects and features of the invention which will become apparent as the following description proceeds, are attained by the self-closing irrigation gate, a preferred embodiment of which has been illustrated in the accompanying drawings, by way of example only, wherein:

FIGURE 1 is a vertical sectional view of the invention illustrating the self-closing irrigation gate as installed in conjunction with an irrigation ditch;

FIGURE 2 is a front elevational view of the invention;

FIGURE 3 is a partial perspective view of the inlet pipe showing the anchor fin utilized in the invention; and FIGURE 4 is a perspective view of a partial perspective view illustrating a portion of the invention with a restricter nozzle attached.

With continuing reference to the accompanying drawings wherein like reference numerals designate similar parts throughout the various views, reference numeral 10 is used to generally designate an irrigation ditch having the intake pipe 12 of the self-closing irrigation gate comprising the present invention and generally indicated by reference numeral 14 embedded in the bank 16 thereof. The intake pipe 12 may be provided with a circular fin or flange 18 or any number thereof which is welded to the outer surface of the pipe 12 for anchoring the pipe 12 in the bank 16 of the irrigation ditch. An elbow 20 is provided at the intake end of the intake pipe 12 and includes a widened flanged end fitting 22 which is suitably secured to the end of the intake pipe 12. The other end of the elbow 20 is provided with a filter screen as at 26. The elbow 20 may be stationary or adjustable and the filter screen is optional.

Secured to the intake pipe 12 at the end thereof which extends through the bank 16 is a self-closing gate assembly 28. The self-closing gate assembly 28 includes a stand pipe 30 preferably integrally formed with the substantially horizontal section 32 which has a flange portion as at 34 for receiving the end of the intake pipe 12 which is secured thereto. Preferably integrally formed with the horizontal portion 32 is a valve portion 36 which extends angularly downwardly at a 45° angle. Welded to the valve section 36 as at 38 and to the gate assembly at the juncture of the stand pipe 30 and the discharge or outlet pipe 40 as at 42 is a valve plate 44 having an aperture 46 therethrough. The plate 44 at the portions thereof surrounding the aperture 46 is suitably cone-shaped to form a seat for a ball valve member 48 adapted to close the aperture 46. Secured to the ball valve member 48 is a control rod 50 which extends upwardly through the cap 52 for the stand pipe 30. The rod 50 may be provided with a handle 54. Suitable guy wires as at 56 and 58 are secured to wires 60 and 62 on the stand pipe 30 and to anchors 64 and 66 in the bank 16 of the ditch 10.

In use, when it is desired to allow fluid flow to irrigate a field it is merely necessary to pull upward on the control rod 50. Water will then flow out and the ball valve member 48 will float in the stand pipe 30 until the water level drops low enough to allow the ball valve member 48 to seat itself again. The ball valve member 48 will remain seated even when there is a considerable amount of fluid in the ditch 10 because of the force of the head of fluid applied thereon due to the position of the ball valve 48 once it is in an engaged position with the valve plate 44.

A restricter nozzle 60 may be provided for the outlet pipe 40 and this restricter nozzle which may be threaded or otherwise secured on the outlet pipe 40 may be provided with a series of lines as at 62 extending around the cone-shaped nozzle 60. These lines are located at specific intervals and marked with figures denoting the specific water flow capacities. The user may cut to the desired line with a pair of tin snips and the nozzle may be fastened to the gate assembly by metal screws, fasteners, or any other means besides threading that will hold the nozzle in place. The use of the restricter nozzle having the different sized opening therein and different sized gates, an operator can arrange to irrigate different sized fields from one ditch in the same amount of time. By the use of a main gate, irrigation to all fields may be stopped thus causing the auxiliary gates to close.

The seat of the self-closing valve assembly and the position of the valve plate 44 is placed at a 45° angle to insure positive seating of the ball valve member 48 and to minimize the underhang of the outlet. The opening through the seat as at 46 should be very near one-half of the square area of the outlet pipe thereby causing sufficient restriction to keep the water level in a stand pipe 30 substantially up to the ditch water level.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In an irrigation system for a field having an irrigation ditch alongside thereof and arranged at a higher elevation, a bank separating the ditch from the field and forming one wall of the ditch, an intake pipe arranged horizontally in penetrating relation to the bank with the inner end communicating with the ditch adjacent the bottom thereof, a vertically disposed standpipe communicating with the outer end of intake pipe, said standpipe extending above the water level in the irrigation ditch, a downwardly extending outlet pipe communicating with the intake pipe at the juncture between the intake pipe and standpipe, the lowermost end of the outlet pipe extending below the level of the intake pipe, a valve seat in said outlet pipe and disposed below the center of the intake pipe, a float valve vertically movably disposed in said standpipe and engageable on said valve seat with the column of water in the standpipe holding the valve on the valve seat, an operating rod connected to the valve and extending upwardly above the upper end of the standpipe thereby enabling the valve to be lifted upwardly into the standpipe where it will remain floating for discharge of water from the ditch into the field until the water level in the ditch falls whereby the float valve automatically closes the outlet pipe with subsequent incoming water holding the valve on the valve seat, and means mounted on said intake pipe intermediate the ends thereof for anchoring the same in the bank.

References Cited in the file of this patent

UNITED STATES PATENTS

| | | |
|---|---|---|
| 337,819 | Dill | Mar. 16, 1886 |
| 863,764 | Taylor | Aug. 20, 1907 |
| 872,005 | McCullough | Nov. 26, 1907 |
| 1,054,986 | Proctor | Mar. 4, 1913 |
| 1,065,899 | Guyton | June 24, 1913 |
| 1,381,427 | Patrick | June 14, 1921 |
| 1,503,736 | Wilson | Aug. 5, 1924 |
| 1,548,298 | Woodard | Aug. 4, 1925 |
| 1,551,883 | Humphrey | Sept. 1, 1925 |
| 1,828,866 | Hutton | Oct. 27, 1931 |
| 2,362,747 | Duke | Nov. 14, 1944 |
| 2,496,518 | Candler | Feb. 7, 1950 |